United States Patent
Wilson (10) Patent No.: US 10,827,564 B1
(45) Date of Patent: Nov. 3, 2020

(54) WINDOWS WITH HEATABLE INFRARED-TRANSPARENT AREAS

(71) Applicant: Apple Inc., Cupertino, CA (US)

(72) Inventor: James R. Wilson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 549 days.

(21) Appl. No.: 15/615,547

(22) Filed: Jun. 6, 2017

Related U.S. Application Data (60) Provisional application No. 62/372,447, filed on Aug. 9, 2016.

(51) Int. Cl.
*H05B 3/86* (2006.01)
*B32B 17/10* (2006.01)
*B32B 17/06* (2006.01)

(52) U.S. Cl.
CPC .............. *H05B 3/86* (2013.01); *B32B 17/061* (2013.01); *B32B 17/10174* (2013.01); *H05B 2203/013* (2013.01)

(58) Field of Classification Search
CPC . H05B 3/86; H05B 3/84; H05B 3/845; H05B 3/26; H05B 3/267; H05B 3/0042; H05B 2203/013; H05B 2203/031; H05B 2214/02; B32B 17/061; B32B 17/10174; B32B 17/10183; B32B 17/10192; B32B 17/10201; B32B 17/1022; B32B 17/10229; B32B 17/10266; B32B 17/10385
See application file for complete search history.

(56) References Cited

U.S. PATENT DOCUMENTS

| | | | |
|---|---|---|---|
| 5,824,994 A | 10/1998 | Noda et al. | |
| 6,008,473 A | 12/1999 | Gillner et al. | |
| 6,204,480 B1 | 3/2001 | Woodard et al. | |
| 6,625,875 B2 | 9/2003 | Sol | |
| 8,022,333 B2 | 9/2011 | Maeuser | |
| 2005/0134959 A1* | 6/2005 | Simpson | B32B 17/10 359/359 |
| 2016/0374150 A1* | 12/2016 | Guillaume | B32B 17/10036 |

OTHER PUBLICATIONS

Matsuyuki et al., U.S. Appl. No. 15/231,170, filed Aug. 8, 2016.

* cited by examiner

*Primary Examiner* — Shawntina T Fuqua
(74) *Attorney, Agent, or Firm* — Treyz Law Group, P.C.; G. Victor Treyz; David K. Cole (57) ABSTRACT

A window such as a vehicle window may have an infrared-light-blocking area formed from an infrared-light-blocking layer. The window may also have an infrared-light-transparent area formed from an infrared-light-transparent layer that is not covered by the infrared-light-blocking layer. The infrared-light-transparent layer may have a conductive layer that is transparent to near-infrared light such as a conductive oxide layer or a metal layer. The infrared-light-blocking layer may have one or more layers of infrared-light-reflecting material such a silver layer that is electrically coupled to the conductive layer in the infrared-light-transmitting layer. Ohmic heating current may be passed to the conductive layer in the infrared-light-transmitting layer through the conductive layer in the infrared-light-blocking layer or through elongated metal contacts that run along edges of the infrared-light-transmitting layer.

20 Claims, 9 Drawing Sheets

FIG. 10 ical patent
WINDOWS WITH HEATABLE INFRARED-TRANSPARENT AREAS

This application claims the benefit of provisional patent application No. 62/372,447, filed Aug. 9, 2016, which is hereby incorporated by reference herein in its entirety.

FIELD

This relates generally to systems with windows, and, more particularly, to systems such as vehicles having windows.

BACKGROUND

Vehicle windows sometimes include heating and light filtering components. For example, vehicle windows may include filter layers that block infrared light. Vehicle windows with infrared-light-blocking capabilities may help avoid excessive heat buildup in vehicles that are exposed to sunlight. A rear window in a vehicle may use an ohmically heated wire for defrosting. In some vehicles, portions of windows are coated with black ink to hide interior components from view.

It can be challenging to incorporate systems such as these effectively into a vehicle. If care is not taken, window structures may be unsightly or may not accommodate desired components.

SUMMARY

A system such as a vehicle may have windows. A window may have an infrared-light-blocking area formed from an infrared-light-blocking layer supported by one or more transparent layers such as rigid glass or plastic layers. The window may also have an infrared-light-transparent area formed from an infrared-light-transparent layer on the transparent layers of glass or plastic.

The infrared-light-blocking layer may have one or more layers of infrared-light-reflecting material such as silver or other metal. The infrared-light-transparent layer may have a conductive layer that is transparent to near-infrared light such as a conductive oxide layer or a metal layer. A conductive layer in the infrared-light-blocking layer such as a silver layer may be electrically coupled to the conductive layer in the infrared-light-transmitting layer.

The vehicle may have a body in which a vehicle window is mounted. Control circuitry in the body may be used to generate an ohmic heating current. The ohmic heating current may be passed to the conductive layer in the infrared-light-transmitting layer through the conductive layer in the infrared-light-blocking layer or through elongated metal contacts that run along edges of the infrared-light-transmitting layer.

DETAILED DESCRIPTION

A system may have windows with one or more structural layers such as layers of glass or rigid plastic. For example, a window may have an outer structural layer such as an outer glass or plastic layer that is laminated to an inner structural layer such as an inner layer of glass or plastic using a layer of polymer. To provide the windows with desired optical properties, additional structures may be incorporated into the windows. These additional structures may include dielectric thin films, conductive layers such as thin-film metal layers, layers that form filters for blocking infrared, visible and/or ultraviolet light, ink layers and other layers for adjusting the outward appearance of part or all of a window, and/or other structures.

A system such as a vehicle may have light-based components such as light detection and ranging (LIDAR) systems, infrared illumination systems for supporting night vision, and other optical systems. These components may operate at near-infrared wavelengths of 900-1000 nm, more than 800 nm, less than 1800 nm, or other suitable wavelengths. To allow near infrared light-based components such as near infrared LIDAR systems to operate through a window in a system such as a vehicle, the window may be provided with one or more infrared-transparent areas (infrared-light-transparent areas). These areas may be provided with an appearance that matches the appearance of adjacent portions of a window. The adjacent portions of the window may, for example, have a light gray appearance associated with an infrared-light-blocking coatings and light visible window tint and/or may have an opaque black appearance associated with a black ink window coating or other window layer. To match the appearance of the infrared-transparent areas of a window to adjacent areas that may block infrared light, the infrared-transparent areas may be provided with thin-film coatings. If desired, the thin-film coatings may have multiple layers and may form thin-film interference filters.

It may be desirable to ohmically heat an infrared-transparent area of a window to device and/or defrost the area and ensure that a light-based component that is aligned with the area operates satisfactorily and is not blocked by ice or window condensation. To facilitate ohmic heating, at least one of the layers in the thin-film coating for the infrared-transparent area may be formed from a conductive layer. Current may be applied to the conductive layer to ohmically heat the conductive layer and thereby defrost and/or device the infrared-transparent area in the window.

Figure 1:
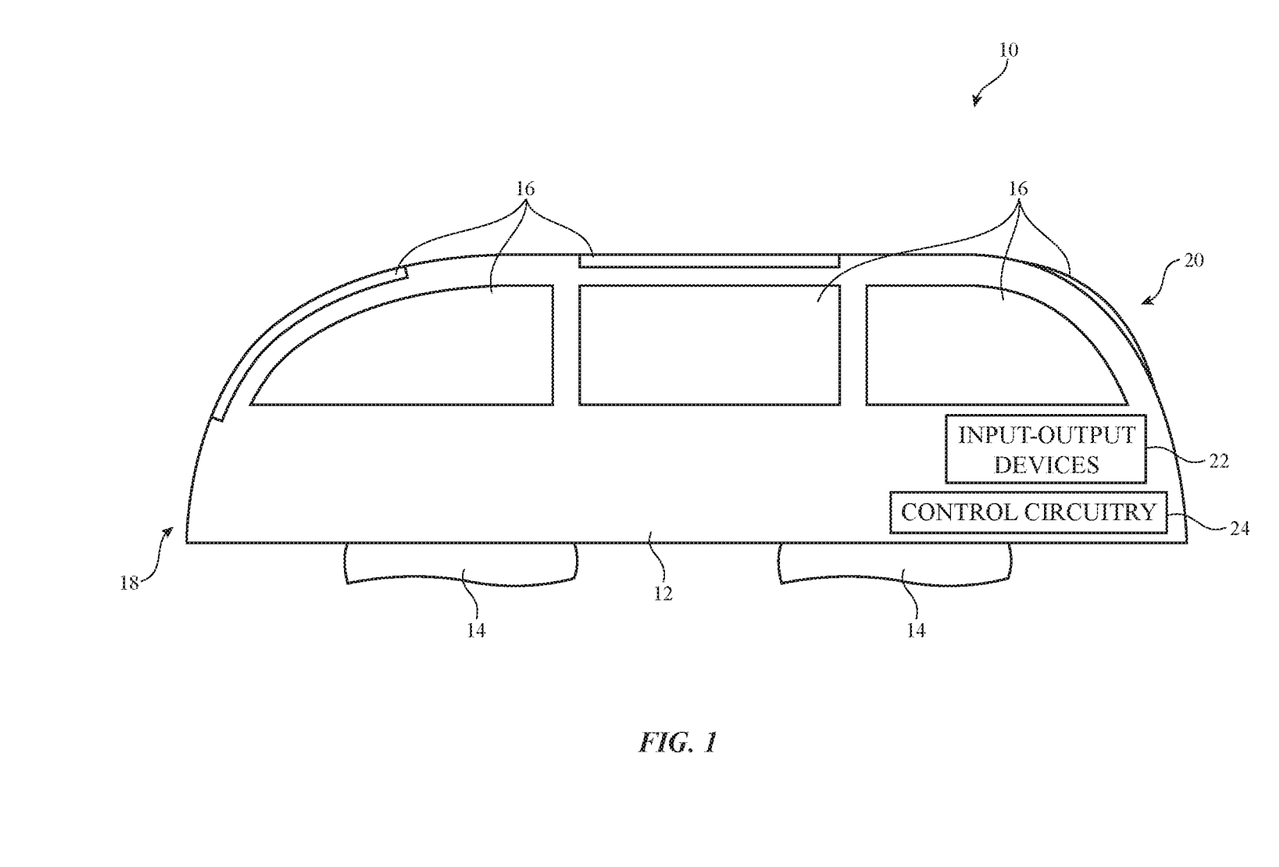
FIG. 1 is a schematic diagram of an illustrative system in accordance with an embodiment.

An illustrative system with windows is shown in FIG. 1. As shown in FIG. 1, system 10 may be a vehicle having portions such as portions 18 and 20. Portion 18 may include wheels 14, a body such as body 12 with a chassis to which wheels 14 are mounted, propulsion and steering systems, and other vehicle systems. Body 12 may include doors, trunk structures, a hood, side body panels, a roof, and/or other body structures. Seats may be formed in the interior of vehicle 10. Portion 20 may include windows such as window(s) 16 mounted to body 12. Window 16 and portions of body 12 may separate the interior of vehicle 10 from the exterior environment that is surrounding vehicle 10.

Windows 16 may include front windows on the front of vehicle 10, a moon roof (sunroof) window or other window extending over some or all of the top of vehicle 10, rear windows on the rear of vehicle 10, and side windows on the sides of vehicle 10. Windows 16 may be formed from one or more layers of transparent glass, clear rigid polymer (e.g., polycarbonate), polymer adhesive layers, and/or other layers. In some arrangements, window(s) 16 may include laminated window structures such as one or more transparent layers (glass, rigid polymer, etc.) with interposed polymer layer(s). The polymer in a laminated window may be, for example, a polymer such as polyvinyl butyral (PVB) or ethylene-vinyl acetate (EVA).

Vehicle 10 may include control circuitry 24 and input-output devices 22. Control circuitry 24 may include storage and processing circuitry for supporting the operation of vehicle 10. The storage and processing circuitry may include storage such as hard disk drive storage, nonvolatile memory (e.g., electrically-programmable-read-only memory configured to form a solid state drive), volatile memory (e.g., static or dynamic random-access-memory), etc. Control circuitry 24 may also include processing circuitry based on one or more microprocessors, microcontrollers, digital signal processors, baseband processors, power management units, audio chips, application specific integrated circuits, etc.

Processing circuitry in control circuitry 24 may be used to control the operation of vehicle 10 and the components in vehicle 10 (e.g., components associated with windows 16 and input-output components 22, etc.). For example, control circuitry 24 can apply signals (ohmic heating currents) to conductive films in windows 16 to ohmically heat windows 16 or portions of windows 16.

Input-output devices 22 may be used to gather data for vehicle 10, may be used to gather information from a user (vehicle occupant, etc.) of vehicle 10, may be used to provide data from vehicle 10 to external systems or a user, and/or may be used in handling other input and output operations. Input-output devices 22 may include buttons, scrolling wheels, touch pads, key pads, keyboards, and other user input devices. Microphones may be used to gather voice input from a user and may gather information on ambient sounds. Devices 22 may include ambient light sensors, proximity sensors, magnetic sensors, force sensors, accelerometers, image sensors, and/or other sensors for gathering input. Output may be supplied by devices 22 using audio speakers, tone generators, vibrators, haptic devices, displays, light-emitting diodes and other light sources, and other output components. Vehicle 10 (e.g., devices 22, etc.) may include wired and wireless communications circuitry that allows vehicle 10 (e.g., control circuitry 24) to communicate with external equipment and that allows signals to be conveyed between components (circuitry) at different locations in vehicle 10.

Light filter layers and other layers may be incorporated into window 16. As an example, an infrared-light-blocking filter may be used to cover some or all of a window. As another example, portions of window 16 may be covered with opaque material (e.g., black ink, thin-film dielectric interference filters, coatings of metal, and/or other coatings for masking layers, light filtering, etc.). These layers may be formed from thin-film coatings deposited using physical vapor deposition or other thin-film deposition techniques, may be applied as a polymer coating (e.g., by spraying, printing, etc.), may be formed by laminating a flexible polymer film that includes these layers to window 16, or may be formed using other suitable fabrication techniques.

Inclusion of light filter layers, masking layers, and other layers into window 16 may alter the visible light and infrared light transmission of window 16. For example, visible light transmission in the infrared-light-transmitting area and visible and/or infrared light transmission in the infrared-light-blocking area may be reduced in (e.g., to 70-95%, to less than 95%, to less than 85%, to less than 75%, to less than 30%, to less than 10%, to less than 5%, to more than 25%, to more than 50%, to more than 70%, etc.). In the infrared-light-blocking layer, infrared light transmitting may be reduced to less than 50%, less than 25%, less than 10%, or more than 1% (as examples).

Infrared light blocking may be desirable to prevent excessive heat buildup in the interiors of vehicles exposed to sunlight. Visible light blocking may be used to cut down on transmitted light levels (e.g., to reduce excessive bright light to more desirable brightness levels). To ensure satisfactory operation of light-based components such as infrared-light LIDAR systems or other infrared systems, portions of a window layer adjacent to a LIDAR system may be selectively modified. For example, an infrared-light-transmitting area may be created adjacent to a LIDAR system through which light emitted from the LIDAR system and through which reflected light being detected by the LIDAR system may pass. The infrared-light-transmitting area may be partly or fully surrounded by an infrared-light-blocking area.

To visually match the infrared-light-transmitting area to surrounding portions of a window (e.g., infrared-light-blocking and/or visible-light-blocking areas), the infrared-light-transmitting area may, if desired, be provided with layers that help match the appearance of the infrared-light-transmitting area to a surrounding area at visible wavelengths. To facilitate ohmic heating and thereby allowing defrosting and/or deicing of the infrared-light-transmitting areas, the layers in these areas may include at least one conductive layer that can receive ohmic heating current from control circuitry 24.

Figure 2:
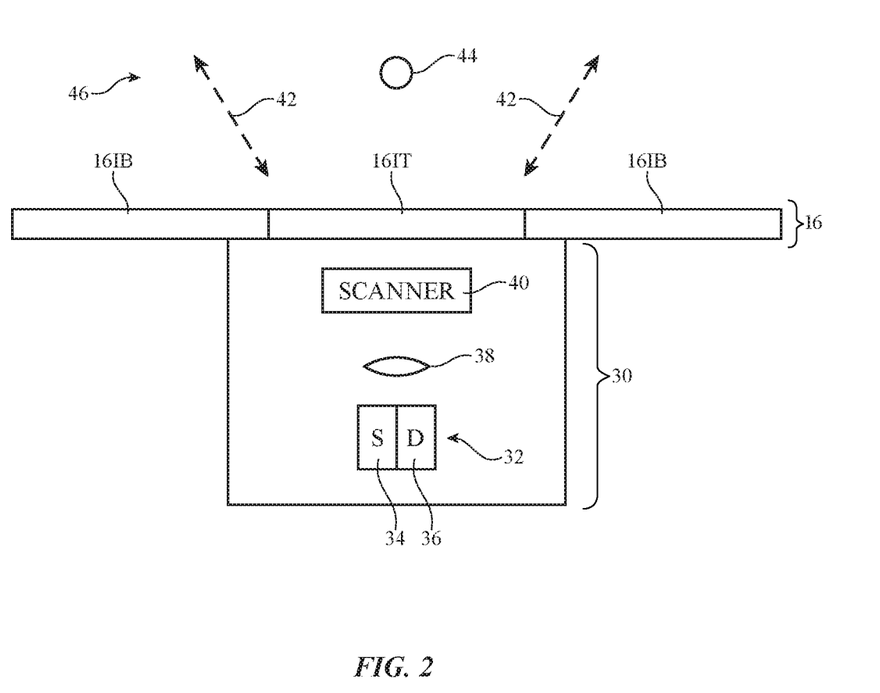
FIG. 2 is a cross-sectional side view of a portion of a window and an associated light-based component such as a light detection and ranging system that operates through an infrared-transparent area of the window in accordance with an embodiment.

A top view of a portion of a window (window 16) and an associated light-based component such as an infrared LIDAR system (system 30) is shown in FIG. 2. System 30 may have light-based devices such as light source 34 (e.g., an infrared light source such as an infrared laser or infrared light-emitting diode operating at wavelengths of 800-1000 nm, 700-2000 nm, more than 1500 nm, less than 1000 nm, or other suitable wavelength), and light detector 36 (e.g., in infrared-sensitive photodiode). Optical system 38 may include one or more lenses for collimating light from source 34 and/or for gathering light for detector 36 from light source 34 that has been emitted by system 30 and that has reflected off of external objects in the exterior region surrounding vehicle 10 (see, e.g., object 44 in exterior 46). Scanner 40 may be used to scan emitted light beams from source 34 across external objects (e.g., over field-of-view 42). System 30 of FIG. 2 is merely illustrative. Any suitable light-emitting and/or light gathering components operating at any suitable wavelengths (e.g., near infrared wavelengths, etc.) may be incorporated into vehicle 10 if desired.

As shown in FIG. 2, system 30 may be aligned with area 161T of window 16. Area 16IT may be an infrared-light-transparent area that allows light emitted by system 30 and detected by system 30 to pass through window 16. Window 16 may also have regions such as regions 161B that surround area 16IT. In regions 161B, window 16 may have layers that serve to block infrared light and/or that block visible light.

Figure 3:
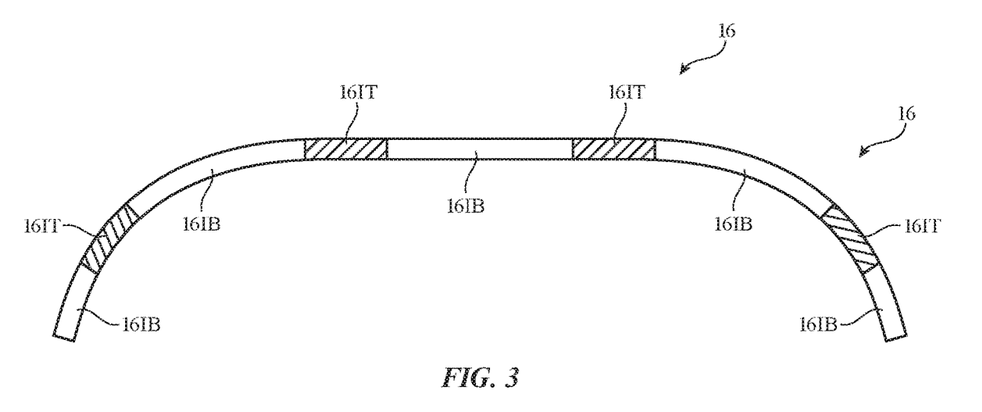
FIG. 3 is a cross-sectional top view of an illustrative window having infrared-transparent areas in accordance with an embodiment.

There may be one or more areas such as area 161T of FIG. 2 in vehicle 10. In the example of FIG. 3, window 16 has four areas 161T, which are spread along window 16 so that LIDAR systems such as system 30 may view the surroundings of vehicle 10 effectively. More areas 161T or fewer areas 16IT may be included in window 16, if desired. The configuration of FIG. 3 is illustrative.

Figure 4:
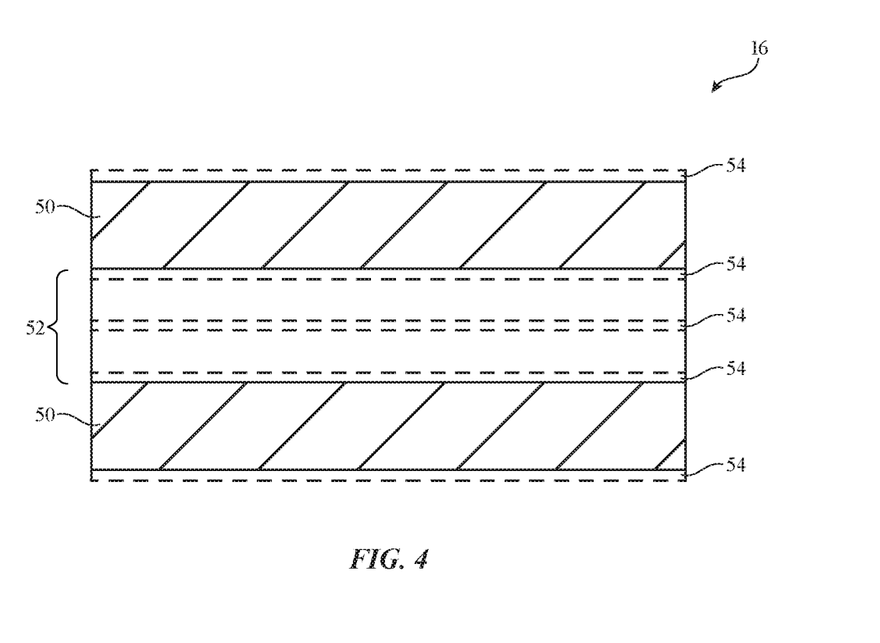
FIG. 4 is a cross-sectional side view of an illustrative window in accordance with an embodiment.

A cross-sectional side view of an illustrative window is shown in FIG. 4. As shown in FIG. 4, window 16 may include one or more transparent structural layers such as structural window layers 50. Two layers 50 are included in window 16 in the example of FIG. 4, but more than two layers or fewer than two layers may be included in window 16, if desired. Layers 50 may be clear layers of rigid polymer, glass, or other transparent material. Polymer layer 52 (e.g., a PVB layer, an EVA layer, or other polymer layer) may be used to couple layers 50 together.

One or more layers such as layer 54 may be included in window 16. These layers may include diffuser layers (e.g., a translucent sheet of polymer, a textured polymer layer coated with a thin transparent metal layer, etc.), a light filter (e.g., one or more metal layers such as one or more silver layers on one or more inorganic or organic dielectric layers, a filter formed from a multilayer dielectric stack having layers with different refractive index values or other multilayer filter structure that is used to block infrared light, ultraviolet light, and/or visible light, etc.), a tint layer (e.g., an optical absorption layer that has a gray color or other suitable color), and/or other layers (e.g., adjustable layers, etc.). One or more of layers 54 may be incorporated into window 16 (e.g., on the inner and/or outer surface of an inner structural layer 50, on the inner and/or outer surface of an outer structural layer 50, and/or embedded within polymer layer 52 (e.g., as a thin metal film, as one or more thin-film coating layers on a polymer film carrier or other substrate layer, etc.).

Figure 5:
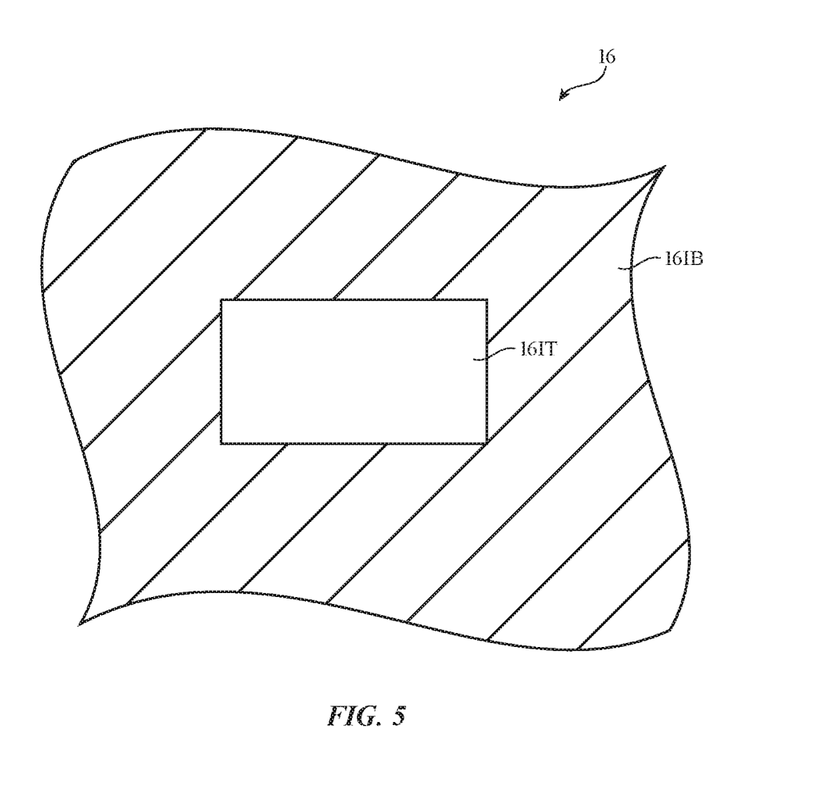
FIG. 5 is a top view of a portion of a window with a layer such as an infrared-blocking layer and an infrared-transparent area that is surrounded by the infrared blocking layer in accordance with an embodiment.

As shown in FIG. 5, layer(s) 54 may be arranged in window 16 to provide some areas such as area 161T with infrared-light transparency (e.g., 70% or more, 90% or more, etc. at wavelengths of 800-1000 nm or other suitable near infrared wavelengths). Surrounding areas such as area 161B may block some or all infrared light (e.g., 50% or more, 90% or more, etc. at wavelengths of 800-1000 nm or other suitable near infrared wavelengths). Area 161T and/or surrounding area 161B may have optical absorption characteristics that cause area 16IT and/or area 161B to reduce visible light transmission. Area 16IT may be aligned with internal optical systems in vehicle 10 such as LIDAR system 30 of FIG. 2. In the example of FIG. 5, area 16IT has a rectangular outline (footprint when viewed perpendicular to the surface of window 16). Areas such as area 161T may also have circular shapes, oval shapes, and/or shapes with other straight and/or curved edges.

Figure 6:
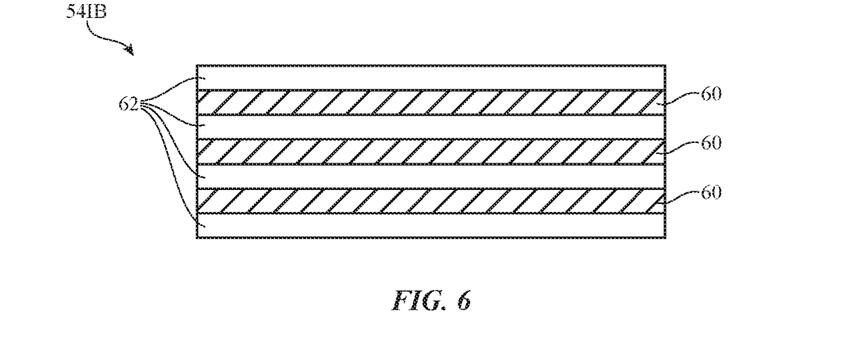
FIG. 6 is a cross-sectional side view of an illustrative infrared-light-blocking layer in accordance with an embodiment.

A cross-sectional side view of an illustrative layer 541B that may be used in portions of window 16 such as region 161B is shown in FIG. 6. Layer 541B may have alternating layers 60 and 62. Layers 60 and/or 62 and/or additional layers of metal, semiconductor, and/or dielectric may be configured to provide layer 541B with desired optical properties. For example, in scenarios in which region 161B is an infrared-light-blocking region, layer 541B may be configured to block infrared light. As an example, layer 541B may include one or more layers such as layers 60 that are formed from silver, other metals, or other materials that reflect infrared light. Layers 62 may be formed from dielectric (e.g., inorganic and/or organic materials such as oxides, polymers, etc.). If desired, the compositions, thicknesses, and locations and numbers of each of the layers of layer 541B may be varied to exhibit desired levels of visible light transmission, visible light absorption, and visible light reflection and to exhibit desired levels of infrared light transmission, infrared light absorption, and infrared light reflection. Infrared light may be blocked in a visible-light-transmitting version of layer 541B and/or in a visible-light-blocking version of layer 541B. Silver layer(s) may be used to block infrared light or other low emissivity coating structures may be used to form layer 541B. The example of FIG. 6 is illustrative.

Figure 7:
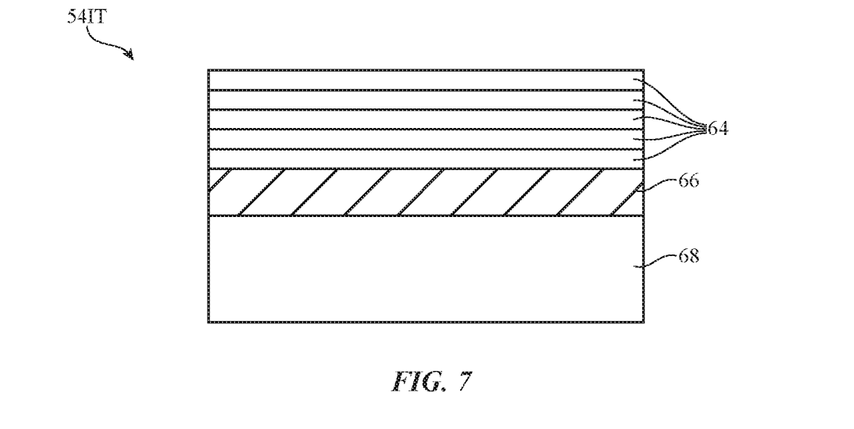
FIG. 7 is a cross-sectional side view of an illustrative infrared-light-transparent layer with a conductive layer for supporting ohmic heating in accordance with an embodiment.

A cross-sectional side view of an illustrative layer 54IT that may be used in portions of window 16 such as area 16IT is shown in FIG. 7. Layer 54IT may have a dielectric stack formed from dielectric layers 64. Layers 64 may include alternating high and low refractive index dielectric layers or patterns of three or more dielectric layers with different respective refractive indices and may be configured to form a thin-film dielectric stack optical filter that transmits near infrared light while transmitting or blocking visible light to a desired degree. If desired, an optical filter formed by layers 64 may be configured to exhibit antireflection properties (e.g., by forming an antireflection layer from the top few layers of layers 64) and/or a color adjustment properties. Layers 64 may be formed form silicon oxide, silicon nitride, titanium oxide, other oxides, nitrides, and/or other inorganic and/or organic materials. To enhance conductivity (e.g., to allow ohmic heating of layer 54IT), layer 54IT may include one or more conductive layers. For example, a layer such as layer 66 may be formed from a metal, a transparent conductive material such as indium tin oxide (e.g. an indium tin oxide with an enhance oxygen content to enhance infrared transmission), other transparent conducting oxides, and/or other conductive materials (e.g., conductive materials that are at least partly transparent at infrared wavelengths). Although layer 66 is shown as being located below layers 64 in the example of FIG. 7, this is merely illustrative. Layer 66 may be embedded within layers 64, may be formed on top of layers 64, and/or may be formed elsewhere in layer 54IT.

If desired, color, light absorption, light transmission, light reflection, and/or other optical properties may also be adjusted using one or more additional layers such as optional layer 68. Layer 68 may be, for example, a semiconductor layer that absorbs different amounts of visible light at different visible wavelengths and thereby adjusts the color of layer 54IT, a polymer layer with a pigment or dye that absorbs visible light and therefore helps reduce visible light transmission for layer 54IT (e.g., layer 68 may be an opaque masking layer formed from black ink or polymer including pigments of different colors), and/or other layers for adjusting the optical properties of layer 54IT.

To apply current to area 16IT to ohmically heat area 16IT, a conductive layer in area 16IB may be shorted (electrically coupled) to an ohmic heating conductive layer in area 16IT. With this arrangement, current may be provided to area 16IT through area 16IB.

Figure 8:
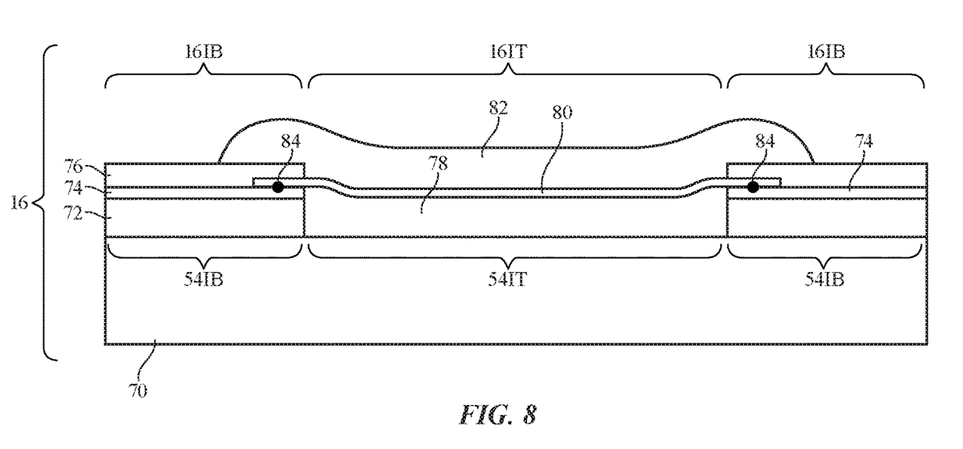
FIG. 8 is a cross-sectional side view of an illustrative window having an infrared-transparent area that is at least partly within an infrared-light-blocking region in accordance with an embodiment.

Consider, as an example, the configuration of window 16 that is shown in FIG. 8. In the example of FIG. 8, area 16IT includes layer 54IT and area 16IB includes layer 54IB. Layers 54IT and 54IB may be supported by substrate 70. Substrate 70 may be a substrate such as a polymer film in a layer 54 that is embedded in polymer 52 of FIG. 4, a polymer film that is laminated to one of layers 50, a structural substrate layer such as one of layers 50, and/or other supporting layers formed from polymer, glass, etc. Layers 54IT and 54IB may be located where indicated by illustrative layers 54 in window 16 of FIG. 4 or at other suitable locations.

Layer 54IB may include layers such as layers 72, 74, and 76. Each of these layers may include one or more dielectric and/or metal layers, or other suitable layers. For example, layer 74 may be a silver layer (see, e.g., layer 60 of FIG. 6) or other conductive layer that forms part of a thin-film stack. Layers 72 and 76 may include additional silver layers (or other metal layers), dielectric layers, or other materials for forming a film such as layer 54IB of FIG. 6 that blocks infrared light.

Layer 54IT may include layers such as layers 78, 80, and 82. Each of these layers may include one or more dielectric and/or metal layers, or other suitable layers. For example, layer 80 may be a conductive layer such as conductive layer 66 of FIG. 7, layer 78 may be a layer such as layer 68 of FIG. 7, and layer 82 may include a stack of layers such as layers 64 of FIG. 7 (as an example). If desired, layers 78 and 82 may include additional layers (dielectric layers, metal layers, semiconductor layers, etc.), for forming a film such as layer 54IT of FIG. 7 that transmits infrared light for system 30. The configuration of FIG. 8 is merely illustrative.

Because both layer 54IB and layer 54IT include conductive layers, current can be routed through area 16IT for defrosting and/or deicing window 16 in area 16IT and thereby ensuring satisfactory operation of system 30. For example, control circuitry 24 may supply current to conductive layer 80 from layer 74 via connections (terminals) 84 between layer 74 and layer 80 during operation of vehicle 10.

Figure 9:
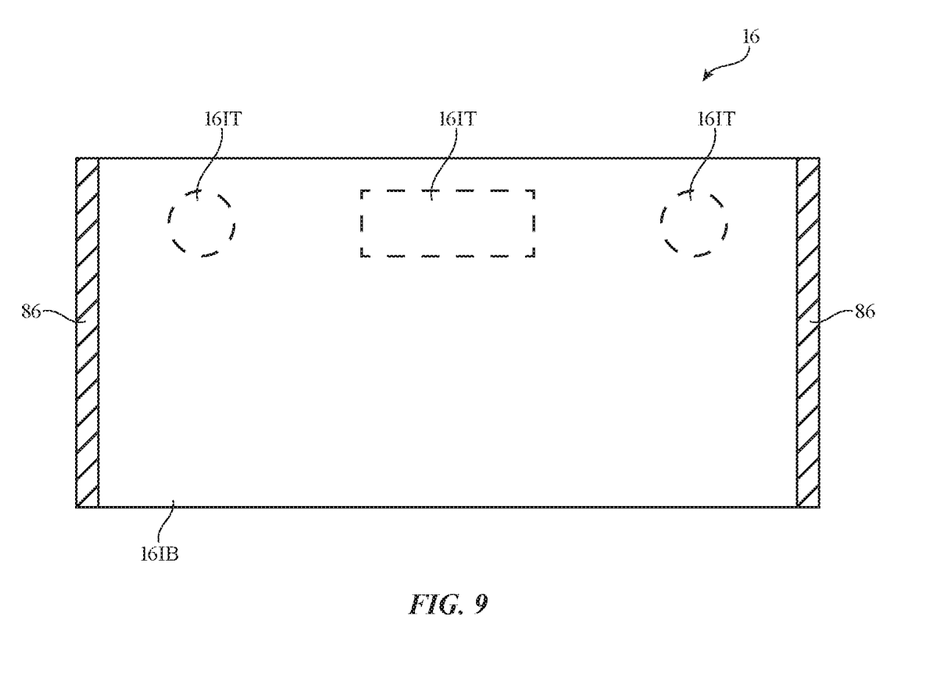
FIG. 9 is a diagram of an illustrative window having terminals (busbars) for applying ohmic heating current to the window and having infrared-light-transparent areas surrounded at least partly by an infrared-light-blocking area in accordance with an embodiment.

FIG. 9 shows how window 16 may have terminals such as terminals 86 (sometimes referred to as busbars) through which current may be applied to window 16 by control circuitry 24. Terminals 86 may be shorted to one or more conductive layers in layer 54IB (FIG. 8) such as conductive layer 74. Terminals 86 may have elongated shapes (e.g., terminals 86 may be formed from strips of metal that run along the edges of window 16, etc.) or may have other suitable shapes. The sheet resistance of the metal or other conductive material in terminals 86 may be less than the sheet resistance of conductive layer 74, which helps spread current along the edges of layer 74 before the current is routed through layer 74 between respective terminals 86. In the example of FIG. 9, infrared-transparent areas 16IT are formed within area 16IB, so conductive layer(s) of material in layers 54IT of areas 16IT such as conductive layer 80 can be provided with current through connections such as connections 84 of FIG. 8. There are three infrared transparent areas 16IT within the surrounding infrared blocking area 16IB in the example of FIG. 9 (two circular and one rectangular). More infrared-transparent areas 16IT, fewer infrared-transparent areas, infrared-transparent areas of other shapes, and/or infrared-transparent areas 16IT that are not completely surrounded by area 16IB (e.g., areas 16IT that are formed along one or more edges of window 16) may also be used.

Figure 10:
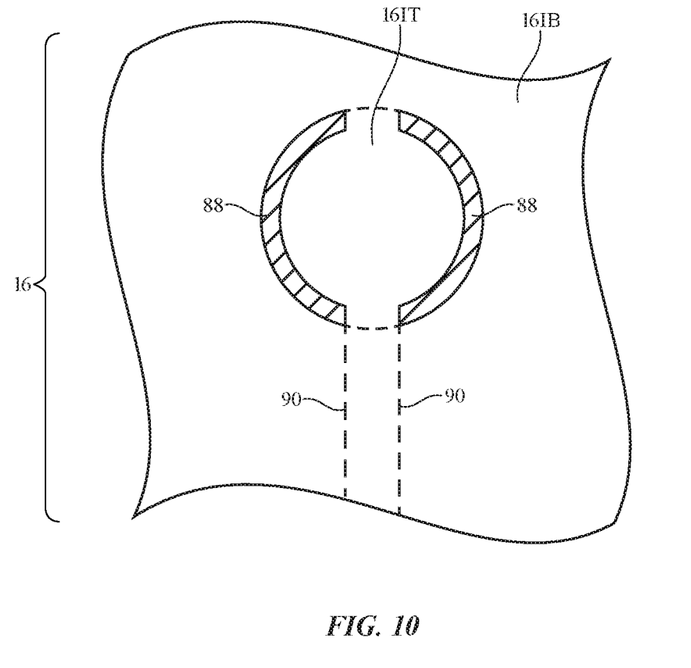
FIG. 10 is a diagram showing how an infrared-light-transparent area on a window may be provided with terminals (busbars) for ohmic heating in accordance with an embodiment.

If desired, infrared-transparent areas 16IT in window 16 may have sets of busbars. As shown in FIG. 10, for example, window 16 may have an infrared-transparent region such as area 16IT that is surrounded by infrared-blocking region 16IB. Area 16IT may have metal strips or other structures that form terminals (busbars) 88 that are shorted directly to one or more conductive layers in area 16IT such as conductive layer 80 (FIG. 8). Signal paths such as conductive traces 90 may be formed in region 16IB (e.g., using patterned metal, patterned indium tin oxide, etc.). Traces 90 may be narrow and need not cover all of area 16IB (as with conductive layer 74). The width of traces 90 may be relatively small (e.g., 1-100 microns, more than 1 micron, less than 500 microns, etc.) so that traces 90 are not unsightly.

The foregoing is merely illustrative and various modifications can be made to the described embodiments. The foregoing embodiments may be implemented individually or in any combination.

What is claimed is:

1. A vehicle window having an infrared-light-blocking area and an infrared-light-transmitting area that is at least partly surrounded by the infrared-light-blocking area, comprising:
    at least one transparent layer;
    an infrared-light-blocking layer that is supported by the transparent layer in the infrared-light-blocking area, wherein the infrared-light-blocking layer includes a first conductive layer; and
    an infrared-light-transmitting layer that is supported by the transparent layer in the infrared-light-transmitting area, wherein the infrared-light-transmitting layer includes a second conductive layer that is electrically coupled to the first conductive layer.

2. The vehicle window defined in claim 1 wherein the first conductive layer comprises metal.

3. The vehicle window defined in claim 2 wherein the second conductive layer comprises a conductive layer selected from the group consisting of: a transparent conductive oxide conductive layer and a metal conductive layer.

4. The vehicle window defined in claim 3 wherein the first conductive layer is a silver layer.

5. The vehicle window defined in claim 4 wherein the second conductive layer comprises a transparent conductive oxide.

6. The vehicle window defined in claim 3 wherein the second conductive layer comprises a thin-film dielectric stack.

7. The vehicle window defined in claim 1 wherein the infrared-light-blocking layer has multiple layers of metal and wherein the first conductive layer is one of the layers of metal.

8. The vehicle window defined in claim 1 wherein the first conductive layer is configured to absorb visible light and wherein the second conductive layer is configured to receive an ohmic heating current through the first conductive layer.

9. A vehicle, comprising:
    a body;
    control circuitry; and
    a vehicle window in the body that has an infrared-light-blocking area with a first conductive layer and that has an infrared-light-transmitting area with a second conductive layer that is electrically coupled to the first conductive layer, wherein the control circuitry is configured to ohmically heat the infrared-light-transmitting area by applying ohmic heating current to the second conductive layer through the first conductive layer.

10. The vehicle defined in claim 9 further comprising:
a light-based system that is configured to emit and detect infrared light that passes through the infrared-light-transmitting area.

11. The vehicle defined in claim 10 wherein the vehicle window comprises first and second transparent conductive layers and wherein the vehicle window comprises a polymer layer between the first and second transparent conductive layers.

12. The vehicle defined in claim 11 wherein the first conductive layer is between the first and second transparent conductive layers.

13. The vehicle defined in claim 12 wherein the first conductive layer comprises metal and wherein the second conductive layer comprises a conductive oxide.

14. The vehicle defined in claim 9 further comprising a light detection and ranging system that emits light that passes through the infrared-light-transmitting area.

15. The vehicle defined in claim 9 further comprising a light detection and ranging system adjacent to the infrared-light-transmitting area, wherein:
the first conductive layer comprise silver;
the second conductive layer comprises a material selected from the group consisting of: a metal and a conductive oxide; and
the vehicle window has at least first and second glass layers and has polymer that attaches the first and second glass layers.

16. A window, comprising:
a glass layer;
an infrared-light-blocking layer having at least one layer of metal, wherein the infrared-light-blocking layer is coupled to the glass layer in an infrared-light-blocking area of the glass layer; and
an infrared-light-transmitting layer that is coupled to the glass layer in an infrared-light-transmitting area of the glass layer that is surrounded by the infrared-light-blocking layer, wherein the infrared-light-transmitting layer has a conductive layer that is configured to receive ohmic heating current.

17. The window defined in claim 16 further comprising elongated metal terminals formed along edges of the conductive layer, wherein the conductive layer is configured to receive the ohmic heating current through the elongated metal terminals.

18. The window defined in claim 16 further comprising elongated metal terminals formed along edges of the infrared-light-blocking layer, wherein the conductive layer is configured to receive the ohmic heating current through the elongated metal terminals, the layer of metal, and the conductive layer.

19. The window defined in claim 16 wherein the layer of metal is a layer of silver.

20. The window defined in claim 16 wherein the conductive layer comprises a conductive layer selected from the group consisting of: transparent conductive oxide layer and a metal layer.

* * * * *